United States Patent [19]
Shurpik

[11] B 3,989,611
[45] Nov. 2, 1976

[54] RADIATION TREATMENT OF POLYMERS CONTAINING ISOBUTYLENE

[75] Inventor: Anton Shurpik, Hauppauge, N.Y.

[73] Assignee: The Firestone Tire & Rubber Company, Akron, Ohio

[22] Filed: Aug. 16, 1974

[21] Appl. No.: 498,205

[44] Published under the second Trial Voluntary Protest Program on February 10, 1976 as document No. B 498,205.

Related U.S. Application Data

[62] Division of Ser. No. 321,814, Jan. 8, 1973.

[52] U.S. Cl. .................... 204/159.18; 204/159.20; 260/33.8 UA; 526/206; 526/339
[51] Int. Cl.$^2$ ....................... C08F 2/46; C08K 5/02
[58] Field of Search ............... 204/159.18, 159.20, 204/159.23

[56] References Cited
UNITED STATES PATENTS

| | | | |
|---|---|---|---|
| 2,814,609 | 11/1957 | Borunsky | 204/159.18 |
| 2,945,792 | 7/1960 | Miller | 204/159.18 |
| 2,962,479 | 11/1960 | Aldridge et al. | 260/85.3 C |
| 3,737,421 | 6/1973 | Halasa | 260/85.3 C |

OTHER PUBLICATIONS

Turner, D. T., Radiation Crosslinking of Rubber–Effect of Additives Journal of Polymer Science, vol. XXVII, pp. 503–514 (1958).

*Primary Examiner*—Murray Tillman
*Assistant Examiner*—Thurman K. Page
*Attorney, Agent, or Firm*—Cooper, Dunham, Clark, Griffin & Moran

[57] ABSTRACT

Homopolymers of isobutylene and copolymers thereof with isoprene (butyl rubber) are subjected to high energy ionizing radiation in the presence of halogenated hydrocarbon radiation catalysts.

5 Claims, No Drawings

RADIATION TREATMENT OF POLYMERS CONTAINING ISOBUTYLENE

This is a division, of application Ser. No. 321,814 filed Jan. 8, 1973.

BACKGROUND OF INVENTION

Irradiation of homopolymers of isobutylene or copolymers of isobutylene and isoprene by prior known techniques has led to degradation. This has precluded the use of these compounds in environments where they would be subjected to irradiation, despite the advantages inherent in such products. It has also precluded their use in compositions and blends such as are often used in the rubber industry when it is intended that such compositions or blends should be cured by irradiation. This is especially important in tire compounding. Tires and their various components often contain a number of rubbers, both natural and synthetic. It has been proposed that tires could be commercially cured or vulcanized by high energy ionizing radiation. However, because so many tire blends contain these ingredients, especially as butyl rubber, the art has not adopted the new techniques.

It is already known to degrade polymers and copolymers of isobutylene by radiation techniques. U.S. Pat. No. 3,080,306 describes the preparation of viscosity improving materials for use as lubricating oil additives by a process in which the molecular weight of the polymeric materials is adjusted downwardly by exposing the polymeric compounds to ionizing radiation after mixing them with certain halogenated hydrocarbons.

Isobutylene is available in several commercial grades ranging in molecular weight from about 225,000 to 6,000,000. One of its commercial trade designations is Vistanex. It is also available as a copolymer with from 0.6 to 3 mole percent of isoprene. The copolymer is known as butyl rubber. Its molecular weight range is also about 225,000 to 6,000,000. It is available in many commercial forms and grades. The materials are useful as replacements for natural rubber, in the formation of adhesive compounds such as pressure sensitive tapes and for a variety of other purposes. Important uses of butyl rubber include the formation of inner tubes, and in other products which must be substantially impervious to a gas such as air ... for example gas masks. It has also been compounded for general tire purposes, especially for tires for farm machinery and other off the road vehicles which are operated at low speeds and may be idle for long periods. Even in these uses, however, the rubber is not totally satisfactory because of its tendency to deteriorate.

Butyl rubber has certain properties that make it costly to process. The unvulcanized rubber is subject to cold flow and is very sticky, making it difficult to handle and store. Rates of vulcanization by the usual procedures are much lower than for natural or SBR rubber. Higher temperatures and longer times are generally required for vulcanization. Its extrusion rate is relatively slow.

Polyisobutylene and butyl rubber, because of relatively high resistance to the passage of air, are often used as gasket material. But they are not so used in areas where the gasket would be exposed to radiation because they are subject to deterioration by radiation.

Because of the importance of the problem, and particularly because of the size of the markets involved the art has spent much time and effort attempting to improve polyisobutylene and butyl rubber to make them processable by radiation techniques.

THE INVENTION

It has now been discovered that butyl rubber can be vulcanized utilizing high energy ionizing radiation when the radiation is carried out in the presence of selected halogenated catalysts. It has been found that butyl will actually cure or vulcanize in the presence of these agents provided that the concentration of the radiation catalyst or cross-link promoter is kept at defined levels and the radiation dose is similarly kept at defined level. It has also been discovered that under the same conditions the rate at which polyisobutylene degrades to lower molecular weight products can be so retarded that it becomes practical to cure blends containing polyisobutylene since it is not so badly degraded that its desirable properties are seriously affected.

The halogenated hydrocarbon catalysts utilized in this invention include aromatic as well as linear and cyclic saturated aliphatic halogenated hydrocarbons containing at least one halogen substituent and from one to about twenty carbon atoms. Halogenated aromatic hydrocarbons containing one or two halogen atoms and from six to fifteen carbon atoms, are preferred. These include, for example, dihalogenated biphenyls in which the halogen atoms, especially chlorine, fluorine or bromine are on separate rings in ortho, meta or para positions. They also include mono- and dihalogenated naphthalenes, especially those having chlorine, fluorine or bromine on the same ring. Diphenyl substituted propanes such as 2,2-diphenyl propane with up to two halogen substituents on the phenyl rings, for example, 2-phenyl-2-(4-chlorophenyl)-propane may be usefully employed. Especially preferred catalysts because of their high order of activity in the vulcanization of butyl rubber or the inhibition of the degradation of polyisobutylene are 1,3-dichloro-4-(t-butyl) benzene, bromobenzene and ortho-difluorobenzene. Other specific compounds which can be used are carbon tetrachloride, methyl chloride, bromoform, chloroform, bromotrichloromethane, dichloromethane, 1,1- and 1,2-dichloroethane, 1,2,3,4-tetrabromobutane, 2,3-dichloropentane, chlorocyclohexane, dichlorocyclohexane, dibromocyclopentane, tribromopropane, hexachloroethane, 1,2-difluorobenzene, and the like. Hexachloroethane is an especially preferred aliphatic catalyst. The catalysts are indirect cross-link promoters for butyl rubber in the sense that they do not become a part of the final molecule by forming bridges between molecular segments. The cross-links are for the most part carbon-carbon bridges between molecular segments.

The concentration of halogenated catalyst is normally from about 1 percent to 10 percent by weight based on the total weight of the butyl rubber or polyisobutylene. The preferred concentration is 2 percent to 7 percent. In these concentration ranges the radiation dose is from about 0.5 to 15 megarads, preferably 2 to 10 megarads. Within these parameters there will be optimum doses for each catalyst and an optimum concentration for each catalyst. They can be readily determined by a few simple observations.

As is well known, the effect of radiation on most polymers is to set up competing reactions of cross-linking and chain breaking. The ultimate properties of the irradiated product will depend upon the predominant reaction. With polyisobutylene and butyl rubber the predominant reaction heretofore has been chain breaking or degradation. The usual result has been the formation of products which are too soft to be useful, and in extreme cases the production of products which are not even solid. Gaskets made of polyisobutylene or butyl rubber when used in areas where they are exposed to radiation may become so soft as to actually flow out from between the gasketed faces.

The invention is, of course, not limited by the theory of action, but it appears that with the butyl rubbers the catalysts function by inhibiting degradation to the point where the cross-linking reaction predominates. This point differs with different catalyst, the concentration thereof and the radiation dose. For example, with a particular catalyst at a 2 percent by weight concentration degradation may take place at all dose levels. As the concentration of catalyst increases the rate of degradation decreases until finally a concentration is reached at which cross-linking is the predominant reaction. However, even at optimum concentrations the dose cannot be increased too much since degradation will again become the predominant reaction. The course of the reaction is readily followed by solubility measurements. As cross-linking becomes the predominant reaction the percent of gel formation increases and more and more of the polymer is insoluble in the measuring solvent. At the same time the tensile strength and modulus increase.

With polyisobutylene the rate of degradation is retarded but even with the catalysts concentrations and radiation doses of this invention a point is not reached where cross-linking becomes the predominant reaction.

The process of this invention is useful to precure butyl rubber so that its tendency to cold flow is decreased and it generally becomes easier to handle and to store. This is especially useful when the rubber is for use in a blend. Because of the improved properties, the blend becomes easier to form and may be stored for an appreciable length of time before use. In precuring the rubber is not cured to the point where its optimum properties are developed, but to the point where handling and blending is facilitated. The rubber is thereafter completely cured.

The vulcanizable compositions of this invention comprise uncured copolymers of polyisobutylene containing from 0.6 to 3 mole percent of isoprene monomer having a molecular weight of from 225,000 to 6,000,000 and containing at least one halogenated hydrocarbon radiation catalyst which is selected from the group of aromatic and linear and cyclic saturated aliphatic halogenated hydrocarbons containing from one to about twenty carbon atoms at a concentration of from about 1 to 10 percent, based on the total weight. The preferred catalysts from the point of view of economy and quality of the products produced are 1,3-dichloro-4-t-butyl benzene, bromobenzene, hexachloroethane and ortho difluorobenzene.

The vulcanizates produced by the process of this invention are radiation cross-linked copolymers of isobutylene and isoprene containing from 0.6 to 3 mole percent of isoprene monomer. They comprise cross-linked molecular segments of poly(isobutylene-isoprene) in which the molecular segments have an average molecular weight of from about 225,000 to 6,000,000. While some of the catalyst may be degraded by the radiation, in general the vulcanizate will contain from about 1 to 10 percent by weight based on the total weight of polymer or copolymer of the halogenated hydrocarbon radiation catalyst. The continuing presence of the catalyst helps to impart stability to the product.

In the process of this invention the novel vulcanizable compositions are irradiated with high energy ionizing radiation at a dose of from about 0.5 to 15 megarads to produce the new vulcanizates.

The desired radiation treatment can be accomplished in accordance with this invention by subjecting the selected composition, which as indicated above may be a blend, to an adequate dose of high energy particle irradiation. The technique serves to effect vulcanization of butyl rubber and does not seriously degrade polyisobutylene, and thereby achieve the desired objects. The treatment can be carried out by passing the composition, suitably in the form of a thin layer of from about 0.05 to 0.25 inches in thickness through a beam of high energy electrons under conditions that will give a high energy dose of from 0.5 to 15 megarads. Such a dose is sufficient to effect any desired degree of vulcanization of butyl rubber from a relatively flexible to a hard product. In general, doses of from 2 to 20 megarads are preferred. Typically the dose rate is from about 0.02 to 5 megarads/sec. although appreciable variation is possible. With thicker sheets, for example, up to 0.5 inches, the desired results can be achieved by two passes through the electron beam, first on one side and then on the other.

Various dose rates can be achieved from conventional radiation equipment by techniques known in the art. For example, the desired amount of irradiation can be obtained using a 300 kev electron accelerator which emits a circular beam of electrons from a heated cathode filament. The electrons are guided through a scanning magnet and emerge through a thin titanium window which is approximately 1 by 24 inches. A beam power of 3 kw is obtained at an operating current of 10 mamps. The dose delivered can be measured using the well-known blue cellophane technique. See Henley and Richman; Anal. Chem. 28, 1580 (1956). By altering the beam current, beam diameter and distance to the source, various dose rates of radiation can be obtained.

In practicing the invention, the compositions to be treated are compounded in the usual way which will, of course, vary with the end use of the vulcanized product. If it is to be used in tire construction it may contain reclaimed rubber, oil, vulcanization accelerators, antioxidants, tackifiers and plasticizers, and carbon black. If it is intended for the preparation of hard casings it may contain plasticizer, reclaim rubber and hard rubber dust. It is a special feature of this invention that the compositions to be treated can be compounded in accordance with standard procedures normally employed for such purposes.

The products of this invention are useful for the same purposes as other polyisobutylene and butyl rubber products. Because of their improved resistance to degradation in the presence of radiation they are useful in environments which were previously foreclosed to them. Because of the precure possibilities introduced here for the first time it is possible to store them without difficulty and to compound them with other components, for example natural rubber or polybutadiene-isoprene rubbers and to effect final cure of the compounded mixture by ordinary or radiation techniques.

The following non-limiting examples are given by way of illustration only.

EXAMPLE 1

A mixture of Butyl 600 (a butyl rubber containing 3 mole percent of isoprene with an 8 minute Mooney viscosity of 45 at 100°C. and available from Polymer Corporation, Ltd.) containing 3 percent by weight of the halogenated hydrocarbon radiation catalysts listed in Table 1 was blended in a Brabender at 75°C. for 2 minutes and then pressed in a platen press at 100°C. and 8000 psi on the ram to form samples 6 inches by 6 inches about 75 mils thick. Radiation was effected by subjecting the samples to the electron beam of a 1.5 Mev electron accelerator to the total dose indicated.

The samples were tested for gel formation as follows:

A porous paper thimble was dried to constant weight at about 80°C. to 90°C. in a vacuum oven and weighed. A small portion of the test sample was placed in the cylinder and its weight determined by difference. The thimble containing the sample was then partially immersed in a beaker containing toluene together with about 0.5 percent of di-t-butyl-p-cresol as an antioxidant. The toluene was held at about 70°C. for 24 hours to extract the soluble portion of the sample. The toluene was removed from the beaker and the thimble drained for 15 minutes. The procedure was repeated three times. After the third extraction the thimble containing the insoluble, gelled residue of the original sample was first air dried and then vacuum dried at 80°C. to 90°C. for 24 hours. It was weighed, the weight of the residue calculated, and the percent gel determined.

Table 1

| Catalyst | % gel | |
|---|---|---|
| | 5 Mrad | 10 Mrad |
| Bromobenzene | 50 | 30.2 |
| Hexachloroethane | 3.2 | 34.4 |
| o-Difluorobenzene | 29.8 | 33.0 |

There was no gel formation in the untreated samples. In each of the gelled samples an increase in tensile strength was observed.

EXAMPLE 2

Samples of Butyl 365 containing 2 percent by weight of 1,3-dichloro-t-butyl benzene were prepared as described in Example 1. They were similarly treated and tested for gel formation. At 5 Mrads the percent gel formation was 67.3. At 10 Mrads it decreased to 44.1, and at 15 Mrads it decreased still further to 32.9.

Butyl 365 is a butyl rubber containing 2.5 mol percent of isoprene with an 8 minute Mooney viscosity of 41–49.

EXAMPLE 3

Vistanex L-140 a polyisobutylene homopolymer with a specific gravity of 0.92 and a viscosity average molecular weight of 2,000,000 was mixed with 2 percent by weight of the catalyst of Example 2 and samples prepared and treated as described in that example to a total dosage of 15 Mrads. No gel formation was observed by solubility measurements, but a decrease of 25 percent in the rate of degradation was observed compared with similarly treated Vistanex which did not contain the catalyst. This determination was made by comparing the viscosity average molecular weights of irradiated samples with and without catalysts.

What is claimed is:

1. A process which comprises subjecting compositions containing polymers of isobutylene and copolymers thereof with isoprene, the isoprene content of the copolymers being from 0.6 to 3 mole percent, the average molecular weight of the polymers and copolymers being from 225,000 to 6,000,000 together with from about 1 to 10 percent by weight based on the total weight of polymer or copolymer of a halogenated hydrocarbon radiation catalyst to high energy ionizing radiation at a total dose of from 0.5 to 15 megarads.

2. A process as in claim 1 wherein the radiation dose is from 2 to 10 megarads.

3. A process as in claim 1 wherein the catalyst content of the composition is from 2 to 7 percent.

4. A process as in claim 1 wherein the catalyst is a halogenated aromatic hydrocarbon containing up to two halogen atoms and from six to fifteen carbon atoms.

5. A process as in claim 1 wherein the catalyst is 1,3-dichloro-4-t-butyl benzene, bromobenzene, hexachloroethane or ortho difluorobenzene.

* * * * *